US005698275A

United States Patent [19]
Pompeo

[11] Patent Number: 5,698,275
[45] Date of Patent: Dec. 16, 1997

[54] MAGNETIZED FLORAL SYSTEM

[76] Inventor: Thomas J. Pompeo, 3420 Genesee St., Cheektowaga, N.Y. 14225

[21] Appl. No.: 552,732

[22] Filed: Nov. 3, 1995

[51] Int. Cl.⁶ .................................................. A41G 1/00
[52] U.S. Cl. ........................ 428/24; 428/26; 428/900
[58] Field of Search ............................. 428/24, 25, 26, 428/31, 99, 900; 156/61; 362/122

[56] References Cited

U.S. PATENT DOCUMENTS

| | | | |
|---|---|---|---|
| 3,088,295 | 5/1963 | Haines | 428/24 X |
| 3,241,857 | 3/1966 | Goetz | 428/31 X |
| 3,574,901 | 4/1971 | Nogue | 428/24 X |
| 4,835,024 | 5/1989 | Hallay | 428/24 |
| 5,076,196 | 12/1991 | Chan | 428/31 X |
| 5,120,583 | 6/1992 | Garcia | 428/24 |
| 5,158,324 | 10/1992 | Flesher | 428/31 X |
| 5,281,452 | 1/1994 | Cheng | 428/24 |
| 5,508,070 | 4/1996 | DiLapo et al. | 428/24 |

*Primary Examiner*—Henry F. Epstein
*Attorney, Agent, or Firm*—Crossetta & Associates

[57] ABSTRACT

The invention relates to a magnetized artificial floral system wherein artificial flowers have petals formed from a plurality of layers of sheets of flexible sheet material which are fluffed apart in the appearance of a chrysanthemum flower and wired to a magnetic base for removable attachment to a sign assembly which is adapted to vehicle mounting and is foldable for convenient storage.

15 Claims, 3 Drawing Sheets

MAGNETIZED FLORAL SYSTEM

This invention relates to a system for removably affixing artificial flowers to a surface without marring such surface, particularly to a system for magnetically affixing artificial flowers to a metal surface, such as a body panel of a vehicle and/or a novel sign mountable to a vehicle, which is able to withstand the air flow forces of high vehicular speeds.

BACKGROUND OF THE INVENTION

It has become a widespread custom to celebrate festive occasions such as marriage and the like, by decorating rooms and vehicles with artificial flowers and expressive signs. Problems associated with such custom, particularly when vehicles are being decorated, include the inconvenience of existing methods of removably attaching the artificial flowers and/or signs, the damage that may be visited upon the surface upon which they are being attached and the failure of present methods to withstand the air flow stress of high speed vehicle movement.

Several solutions have been proposed for solving such problem in the prior art, but none appear to enjoy commercial success as a satisfactory solution to enabling convenient decoration while avoiding damage to the attachment surface and assuring attachment at reasonable high speed vehicle travel.

One proposed solution has been to tape and/or glue the flower to a vehicle surface, but such is generally not acceptable in that it can damage the surface and generally requires significant undesirable cleanup.

Another has been advanced wherein flags or the like are attached to the automobile by clamps which attach to the rain gutter, wheel well or the like of the vehicle. Such method is very limitative to the artistic expression which might be achieved by the decorator, can cause permanent damage to the vehicle and generally has not enjoyed commercial success in floral decoration. Still another solution has been proposed which utilizes suction cups to attach an artificial flower to an appropriate surface of a vehicle but such method tends to leave marks on the finish of the vehicle and cannot be used with vehicles having certain polishes applied to their body panels.

In recent years there has been a proliferation of systems which use an artificial flower arranged on a magnetic base for removable attachment to magnetizable vehicle surfaces such as painted body panels and the like. Such systems have enjoyed some success, but at speeds above about 30 miles per hour, the buffeting of the air stream over the vehicle, particularly in view of the manner in which the artificial flowers are assembled, tends to cause the flower to come apart or be otherwise damaged and tends to exacerbate disengagement of the magnetized unit from the magnetizable surface.

Generally, in magnetic base artificial flowers of the prior art, the flower itself is assembled by piercing layers of appropriately formed flexible components onto a stiffened central shaft which has been mounted to the magnetic base. In such arrangements of the prior art, the top of the shaft is generally sized to push through a hole in the layer and the artificial flower itself tends to stand stiffly away and upward from the magnetic base and accordingly up and away from the surface of the vehicle when affixed thereto.

With modern streamlined vehicles, wherein outer vehicle surfaces are carefully designed to enhance air flow thereover, such arrangements of the prior art tend to place the mass of the artificial flower at a high profile, above what is believed to be a relatively quiescent layer of air space immediately proximate the surface of the vehicle. It is believed that such placement effectively increases the mass of the artificial flower which is exposed to the air stream flowing over the vehicle surface and that the resistance of the flower mass, coupled with the resistance of the stiffened central shaft to bending, can act as a lever to lift the leading edge of the magnetized base from the vehicle surface during high speed movement.

Further, when artificial flowers comprise an assembly of generally symmetrical distinct layers of material arranged along a central shaft, the layers can rotate on the shaft much the same as a pinwheel. During passage of a vehicle comprising such flowers through the air during high speed travel, it has been observed that such layers of flowers tend to rotate and that during such rotation the layers tend to work toward and even off the end of the shaft. The movement of the mass of the flower away from the surface of the vehicle can increase lifting force upon the magnetized base for detachment and the rotation of the layers can exacerbate disassembly of the flower through working of the layers off the shaft.

It is an object of the present invention to provide a magnetized floral system which can better withstand detachment forces during the stress of high speed vehicle travel.

It is a further object of the invention to provide a magnetized flower assembly which resists disassembly during high speed vehicle travel.

It is a still further object of the invention to provide a sign assembly for convenient attachment of artificial flowers to a vehicle.

These and other objects of the invention will be apparent from the following description.

SUMMARY OF THE INVENTION

The invention relates to a magnetized artificial floral system, comprising an artificial flower for attachment to a magnetizable surface, having petals formed from a plurality of layers of sheets of flexible sheet material, which have been gathered into an accordion fold arrangement, restrained at the center by a wire which also attaches the petals to a magnetic base, and wherein opposite ends of the sheets, which extend away from the wire are separated from each other and fluffed apart into the general appearance of a chrysanthemum flower.

In a further embodiment the petals are composed of a plurality of distinct layers of flexible sheet material mounted to a central shaft which has a male end, preferably threaded, which engages a receiving means of a magnetic base.

Both embodiments are suitable for use on body panels of an automobile and particularly suitable for use on a sign assembly for removable attachment to a vehicle wherein the sign panel comprises a magnetizable material and is removably mounted to an attachment frame having an elongate main member and opposing elongate side members, which pivot from an open position about perpendicular to the main member to a closed position in the direction of the center line of the main member. Such sign assembly is mounted to the vehicle by strap means which engage the main member frame of the sign at a first end and a hollow carrying tube at a second end.

The bottom edge of a vertically positioned sign panel is mounted against a convenient horizontal surface rearward of the rear trunk lid of the vehicle. The hollow tube is placed into the trunk with the tube engaging an inside wall of a lower panel of the trunk. The attachment straps extend from the tube outside the trunk and upwardly to the main member of the attachment frame of the sign assembly. The straps are thus positioned between a lip of a body panel of the vehicle and a mating lip of the trunk lid which engage when the trunk is in a normal closed position. As the trunk lid is pivoted downwardly to a closed position the straps are tensioned against the lip of the trunk lid, the hollow tube is pulled toward the decreasing sized opening through which the straps extend and automatically positions itself for convenient closing of the trunk.

DETAILED DESCRIPTION OF THE INVENTION

Figure 1:
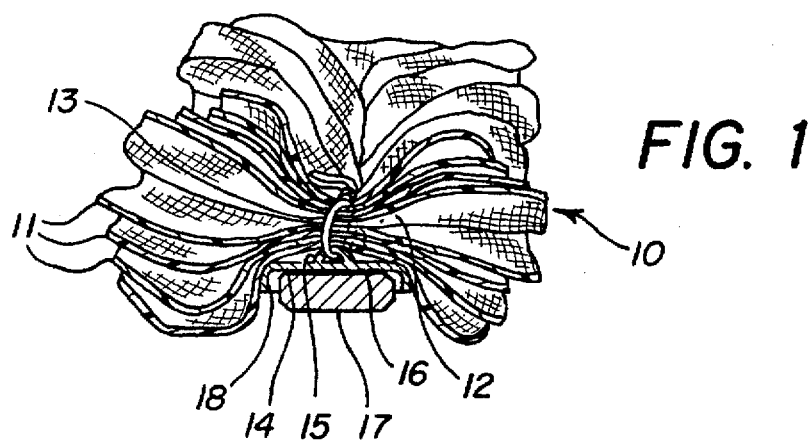
FIG. 1 is an elevational cross sectional view of an artificial flower of the invention.

Referring now to FIG. 1, therein is illustrated an embodiment of a magnetized flower 10 of the invention wherein a plurality of layers 11 of flexible material, which have been gathered in an accordion fold 12, are centrally held by a wire 13 to cup housing 14 through loop 15. Cup housing 14 is glued 16 to magnet 17, which in turn extends beyond lip 18 of cup housing 14. In this illustrated embodiment, layers 11 are shown as separated from each other and upwardly puffed to provide the appearance of an artificial flower.

Figure 2:
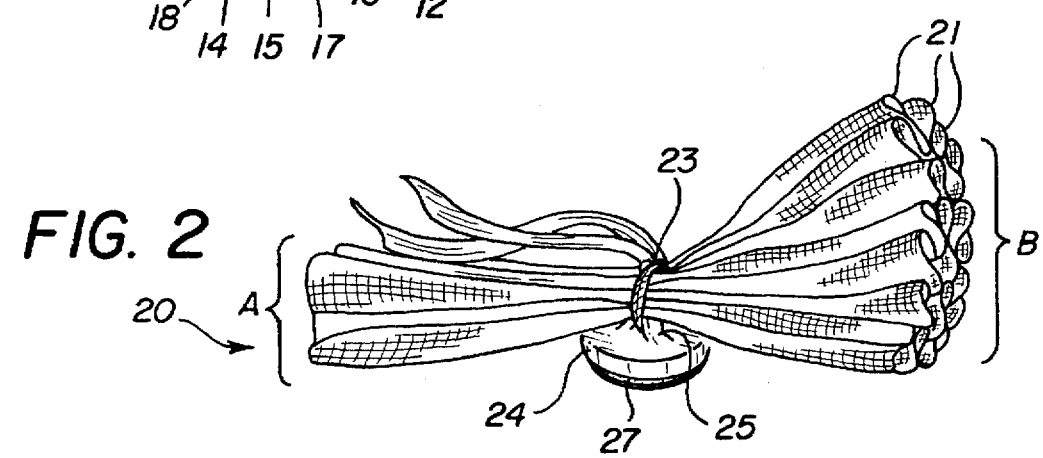
FIG. 2 is a perspective view of an artificial flower of FIG. 1 showing one side in an accordion fold.

FIG. 2, illustrates a further embodiment of a magnetized artificial flower 20 of the invention, which is similar to the embodiment of FIG. 1 in that it comprises a plurality of layers 21 of flexible material, wherein portion A of the flower shows a gathered accordion fold 22 prior to separation of the layers and portion B shows separation of the layers of the flower as puffed to the appearance of an artificial flower. The layers are shown as centrally held by a ribbon 23, which passes through loop 25 of cup housing 24 which in turn is connected to magnet 27.

Figure 3:
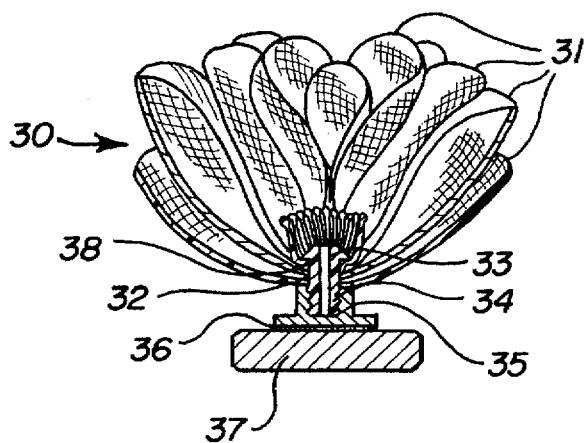
FIG. 3 is an elevational cross sectional view of another embodiment of the artificial flower of the invention.

FIG. 3 illustrates another embodiment of the invention wherein a magnetized artificial flower 30 comprises a petal arrangement having a plurality of distinct layers of flexible material 31. A central shaft 32, inserts about centrally through layers 31 and has an upper restraining end 33 and a threaded male end 34. Threaded male end 34 engages mating threads of receiving member 35, which in turn is glued 36 to magnet 37. It should be understood that it is contemplated that male end 34 is formed from a plastic or the like material and threads may be formed therein by screwing male end 34 into receiving member 35, or that such receiving means may comprise a threaded hole in the magnet into which the male end is threaded.

Stress element 38 is shown as being positioned between upper restraining end 33 and layers 31 and constitutes a washer-like element which abuts upper restraining end 33, thus providing a reinforcement from disassembly of layers 31 from the central shaft. Stress element 38 is illustrated as comprising ornamentation about its perimeter, in the form of flower stamen, for improved visual appearance.

Figure 4:
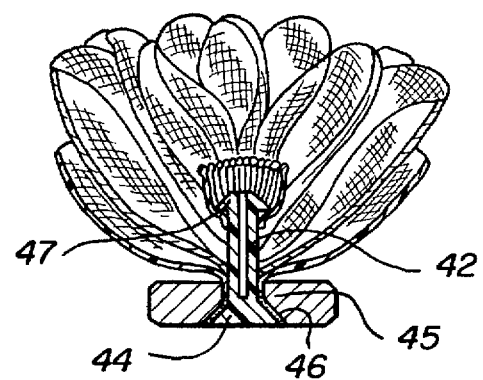
FIG. 4 is an elevational cross sectional view of another embodiment of a male end engaging a base of the magnetized artificial flower of FIG. 3.

FIG. 4 illustrates the petal arrangement of FIG. 3 wherein central shaft 42 has an upper restraining end 47 and a lower restraining male end 44. In this embodiment, shaft 42 is shown as inserted through a hole in magnet 45. Male end 44 is formed during assembly of the petal arrangement containing shaft to the magnet, by heat deformation of the end of the shaft after insertion through the hole. In a preferred embodiment, thermal sensitive glue 46 is applied so that glue distribution between the shaft and the magnet occurs during heat deformation of the end.

Figure 5:
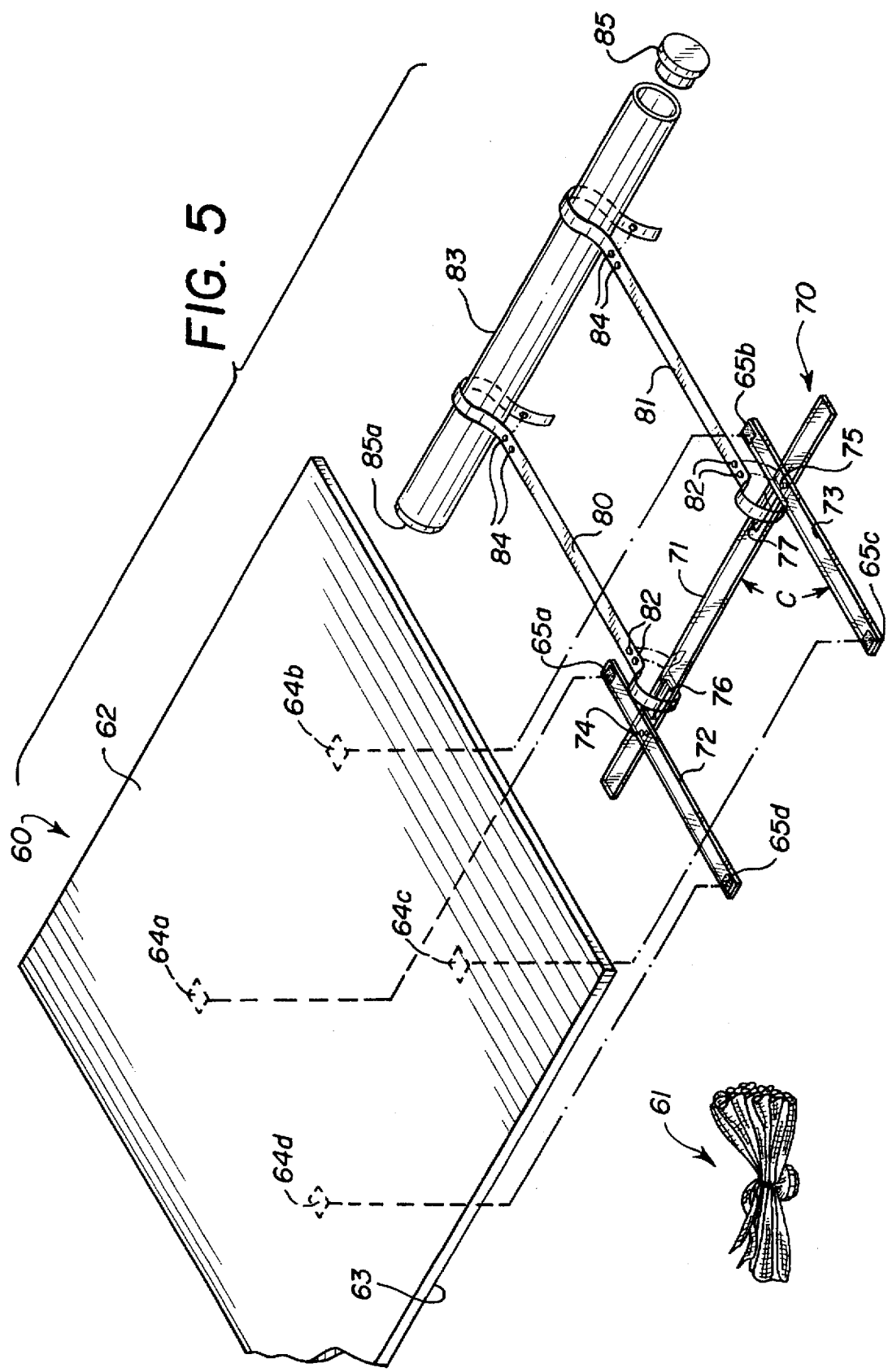
FIG. 5 is an exploded perspective view of a sign assembly comprising a magnetized artificial flower of the invention.
Figure 6:
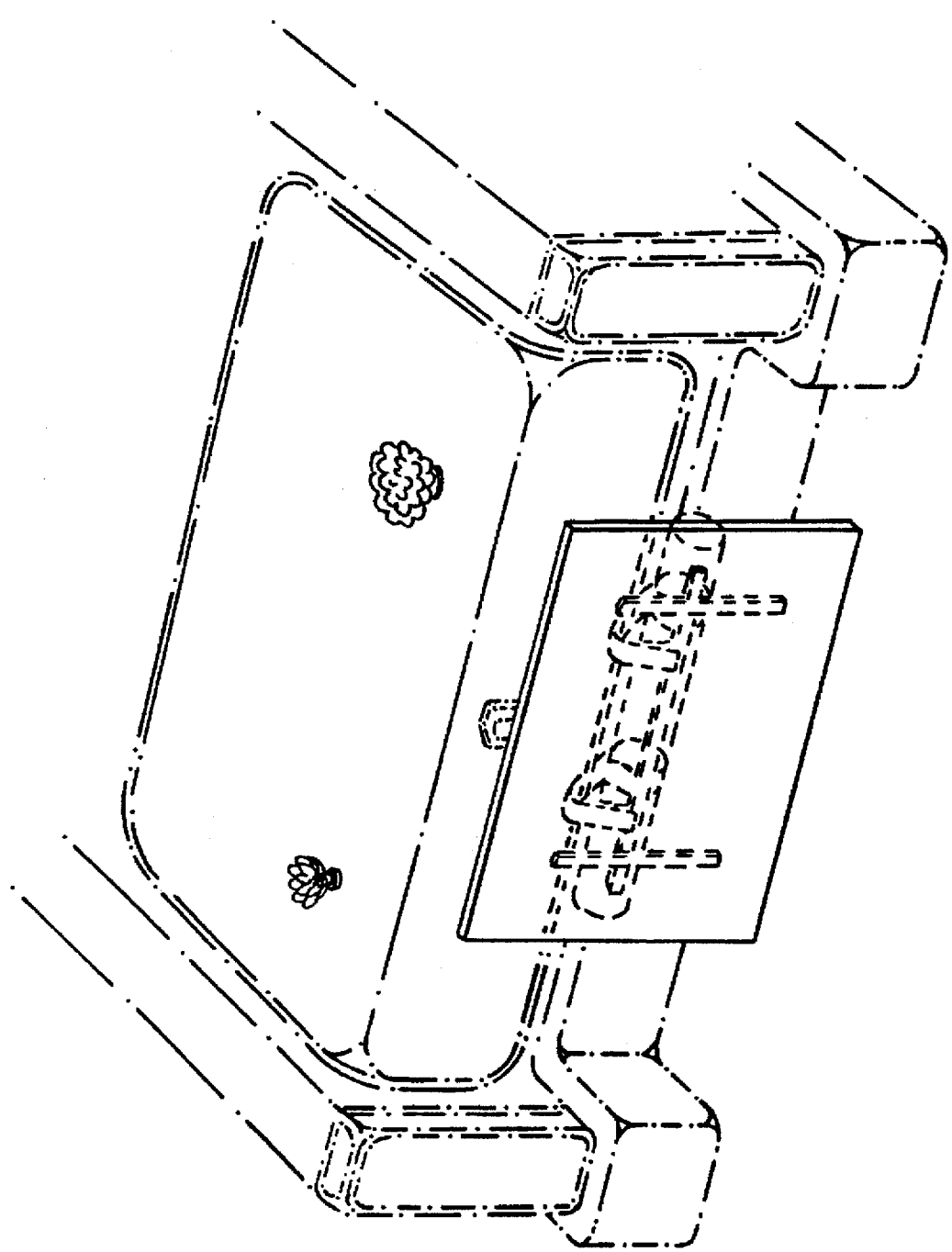
FIG. 6 is a perspective view of the sign assembly of FIG. 5, mounted to the rear trunk compartment of a vehicle shown in phantom line.

Referring now to FIGS. 5 and 6 wherein the sign assembly of the invention is illustrated.

FIGS. 5 and 6 illustrate an embodiment of the sign assembly of the invention. Therein, a sign assembly is illustrated as comprising sign plate 60 having display surface 62 and attachment surface 63. Display surface 62 of sign plate 60 is illustrated as preferably comprised of a markable and/or magnetizable surface to enable decoration and/or attachment a magnetized artificial flower 61 of the invention. Attachment surface 63 is illustrated as having hook and loop attachment elements 64a–d for detachable connection to mating hook and loop elements 65a–d arranged on attachment frame 70.

Attachment frame 70 is illustrated as comprising elongate main member 71 and opposing elongate side members 72a and 72b. Side members 72, 73 are pivotally mounted to elongate member 71 by pins 74 and 75 to enable rotation of side members from and to an open position to a closed position about parallel with main member 71 as illustrated in accord with arrow C.

Slots 76 and 77 are provided, through which first ends of straps 80 and 81 respectively are looped and adjustably fixed by means of snap fasteners 82. Second ends of straps 80 and 81 are illustrated as being looped over hollow carrying tube 83 and adjustably fixed by means of snap fasteners 84. Hollow carrying tube 83 preferably comprises end closures 85 and 85a, at least one of which is preferably removably attached. It should be understood that it is contemplated the length and diameter of tube 83 is sized to accept a closed attachment frame 70 and straps 80 and 81 for storage.

FIG. 6 illustrates the magnetized floral system in use on a vehicle. Therein, the attachment frame of the sign assembly is in an open position with hook and loop fasteners arranged for mating with hook and loop fasteners on the attachment surface of the sign panel. The straps extend from the attachment frame between the trunk lid and mating vehicle panel to the carrying tube which is positioned within the vehicle trunk. The pressing force of the trunk lid against the vehicle panel and/or opposing sealing means surfaces, grips the straps and the carrying tube prevents the straps from being pulled out of the trunk. The attachment frame with sign panel attached rests against the rear bumper or the like surface of the vehicle in a generally vertical position. Magnetized artificial flowers are affixed to the trunk or other magnetizable surface of the vehicle and/or to a magnetizable surface of the sign panel.

I claim:

1. An artificial flower for attachment to a magnetizable surface comprising:

a petal arrangement, composed of a laminate of distinct layers of flexible sheet material, the sheets being stacked, gathered into an accordion fold arrangement and about centrally restrained from unfolding from said accordion fold arrangement by flexible means engaged around the folded stack at about the longitudinal center of said fold arrangement;

a base comprising a generally flat magnetic surface for engaging a magnetizable surface, and loop means at a surface opposite said flat magnetic surface, said loop means being arranged to accept said flexible means of said petal arrangement; and, wherein opposite ends of said flexible sheets, which extend away from said flexible means at about said longitudinal center, are separated from each other and arranged into the appearance of a flower.

2. The artificial flower of claim 1 wherein said base comprises a cup shaped housing having, a magnet mounted therein, said magnet having a generally flat surface which extends beyond the lip of said cup for engaging a magnetizable surface.

3. The artificial flower of claim 2 wherein said cup housing comprises loop means on an outside surface thereof.

4. The artificial flower of claim 1 comprising open loop means.

5. The artificial flower of claim 1 wherein said flexible sheet material is selected from the group consisting of paper, plastic, synthetic fabric, natural fabric and mixtures thereof.

6. The artificial flower of claim 1 wherein said flexible means comprises a wire means.

7. An artificial flower for attachment to a magnetizable surface comprising:

a petal arrangement, composed of a plurality of distinct layers of flexible sheet material having a central opening;

a shaft, arranged through said opening, said shaft comprising a male end arranged for engaging a female receiving means;

a base, comprising a generally flat magnetic surface for engaging a magnetizable surface, and comprising a female receiving means arranged to engage and lockingly mate with said male end.

8. The artificial flower of claim 7 wherein said base comprises a disk shaped magnet and said receiving means comprises a hole in said magnet for receiving said male end.

9. The artificial flower of claim 7 wherein said base comprises a disk shaped magnet having a threaded female member mounted thereto.

10. The artificial flower of claim 7 wherein said base comprises a cup shaped housing having a disk shaped magnet mounted therein, said magnet having a flat surface which extends beyond the lip of said cup for engaging a magnetizable surface, and said cup housing comprising a threaded female receiving means.

11. The artificial flower of claim 7 wherein said male end comprises threads which are cut into said end by rotating said central shaft into a threaded female receiving means.

12. The artificial flower of claim 7 wherein said central shaft is formed from a plastic and said female receiving means is comprised of a metal.

13. The artificial flower of claim 7 wherein said flexible sheet material is selected from the group consisting of paper, plastic, synthetic fabric, natural fabric and mixtures thereof.

14. The artificial flower of claim 7 wherein said base comprises a disk shaped magnet having a hole therein and said male end is inserted and glued into said hole.

15. The artificial flower of claim 7 wherein said base comprises a disk shaped magnet having a hole therein and said male end is deformed for retention in said hole.

* * * * *